United States Patent [19]

Arimura et al.

[11] 3,733,432

[45] May 15, 1973

[54] SYSTEM FOR PRODUCING A CONTINUOUS SIGNAL IN SYNCHRONOUS PHASE WITH A REFERENCE SIGNAL

[75] Inventors: Ichiro Arimura, Kyoto; Hiroshi Taniguchi, Hirakata-shi, both of Japan

[73] Assignee: Matsushita Electric Industrial Co., Ltd., Osaka, Japan

[22] Filed: Oct. 8, 1969

[21] Appl. No.: 864,683

[30] Foreign Application Priority Data

| | | |
|---|---|---|
| Oct. 12, 1968 | Japan | 43/74753 |
| Nov. 11, 1968 | Japan | 43/83112 |
| Nov. 11, 1968 | Japan | 43/83113 |
| Mar. 5, 1969 | Japan | 44/17295 |
| Aug. 5, 1969 | Japan | 44/75467 |

[52] U.S. Cl. ..178/5.4 CD, 178/5.4 SY, 178/69.5 CB

[51] Int. Cl. ....H04n 9/46

[58] Field of Search ....178/5.2, 5.2 A, 5.4 CR, 178/5.4 S, 5.4 NC, 69.5 CB, 69.5 F, 6.6 P, 6.6 SC; 179/100.2 S; 331/11

[56] References Cited

UNITED STATES PATENTS

| | | | |
|---|---|---|---|
| 3,241,084 | 3/1966 | Klingberg | 331/11 |
| 3,488,452 | 1/1970 | Gunning et al. | 179/100.2 |
| 3,528,026 | 9/1970 | Groendycke | 331/11 |
| 3,017,462 | 1/1962 | Clark et al. | 178/6.6 |
| 3,172,949 | 3/1965 | Okazaki et al. | 178/6.6 |
| 3,225,134 | 12/1965 | Jensen | 178/5.4 |
| 3,361,949 | 1/1968 | Brown et al. | 178/6.6 |
| 3,493,680 | 2/1970 | Brown | 178/5.2 |

*Primary Examiner*—Robert L. Richardson

*Attorney*—Stevens, Davis, Miller & Mosher

[57] ABSTRACT

A system for producing a continuous signal in synchronous phase with the color-burst signal of a composite color television signal which is received through a transmission system subject to comparatively large time-base variations such as a VTR, said system including means for comparing in phase said burst signal with the output of an oscillator whose oscillation frequency is nearly equal to that of the burst signal, the phase of oscillation of said oscillator being adjusted according to the detected difference of the phase; characterized in that said system also includes means for detecting variation in the frequency of the synchronizing signal contained in the television signal, the frequency of said oscillator also being adjusted according to the amount of the detected variation, thereby to extend the frequency range in which said oscillator can be pulled into the synchronization; and a method for demodulating the coded color signals utilizing the above-described system.

6 Claims, 11 Drawing Figures

I. ARIMURA &
H. TANIGUCHI
INVENTORS

BY Stevens, Davis, Miller & Mosher
ATTORNEY

SYSTEM FOR PRODUCING A CONTINUOUS SIGNAL IN SYNCHRONOUS PHASE WITH A REFERENCE SIGNAL

This invention relates to a color television system, particularly to a system for producing a continuous signal synchronous in phase with an intermittent reference signal (for example, the color burst signal of the color television signal in the NTSC system or PAL system) which may be received through a transmission system influential on the time base of the signal (for example, a VTR) and which is subject to comparatively large variation in the time base. This invention also relates to a method for demodulating color signals utilizing the above system.

The well known conventional systems for producing a continuous signal synchronous in phase with an intermittent reference signal are the automatic phase control (APC) circuit and the ringing circuit used for producing the reference sub-carrier in color television receivers of the NTSC system or the PAL system. With either of said conventional circuits, however, the frequency range in which the synchronization can be achieved is comparatively narrow, it being at most in the order of 1 kKz, as these circuits utilize quartz oscillators. Therefore, if the intermittent reference signal has passed through a system which may impart considerable jitter to the signal, such as a simplified VTR, and has undergone a frequency variation far more extensive than the above-mentioned synchronizable range, the conventional circuits will fail to produce the continuous signal synchronized with the reference signal; thus the correct detection of the color signals is obstructed.

The main object of this invention is to provide a system for producing a continuous signal in synchronous phase with an intermittent reference signal contained in the composite color television signal, which is provided with an AFC circuit responsive to the variation in the frequency of the reproduced synchronizing signal or the speed of magnetic recording and reproducing apparatus, thereby to ensure the synchronization of the continuous signal with the reference signal even if the latter signal has undergone a considerable variation in the time base or frequency.

Another object of this invention is to provide such a system which makes the above-mentioned synchronization possible even when the frequency of the reference signal has been changed to a frequency entirely different from the normal reference frequency, as is the case with a still reproduction or a slow-motion reproduction of the color television signal recorded on a magnetic recording medium.

A further object of this invention is to provide a simple method for obtaining a reproduced color image of excellent resolution from a composite color TV signal affected by the time base variation by inputting said affected TV signal and the continuous signal synchronized by means of the above-mentioned system into a color TV receiver and detecting the color signals by said continuous signal.

In order to achieve the above objects, the system of this invention for producing a continuous signal synchronous in phase with a reference burst signal of a composite signal containing said reference burst signal and a periodic synchronizing signal, comprises an oscillator the frequency of which is normally nearly identical to that of said burst signal but variable with variable means included therein and responsive to signals, means for comparing the output of said oscillator with said reference burst signal as regards the phase to produce a first error signal, means for detecting the variation in frequency of said periodic synchronizing signal to produce a second error signal, and means for applying said first and second error signals to said variable means included in the oscillator so as to synchronize the output of said oscillator with said reference burst signal as regards the phase.

This invention will be clarified by the following description given with reference to the accompanying drawings in which.

Figure 1:
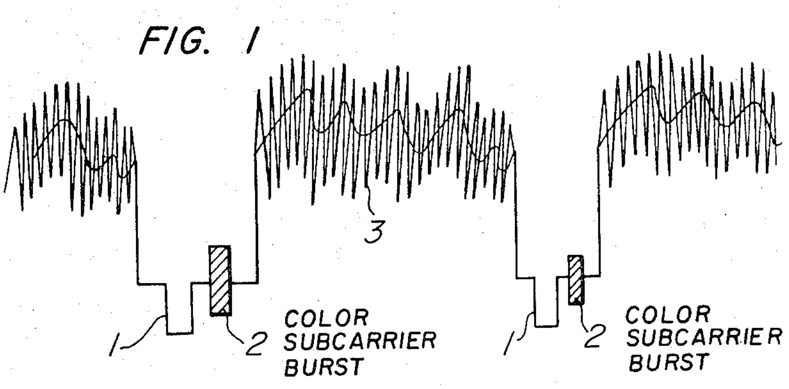
FIG. 1 is a schematic drawing showing a portion of a composite color television signal of the NTSC systems.
Figure 2:
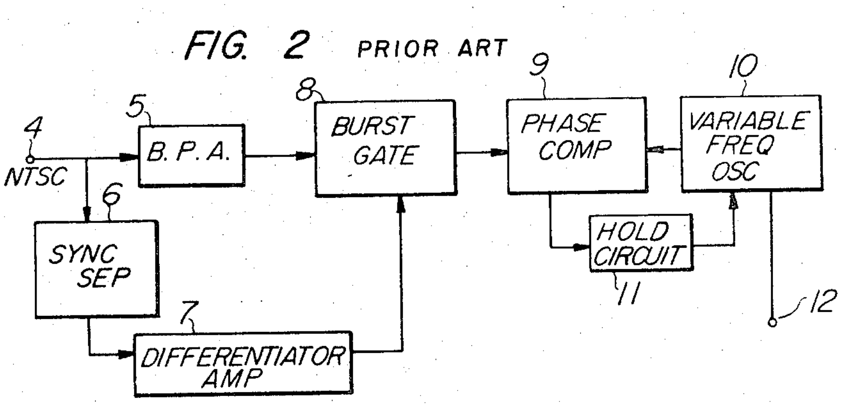
FIG. 2 PRIOR ART
FIG. 2 is a block diagram of the typical APC circuit in the conventional color television receiver.
Figure 3:
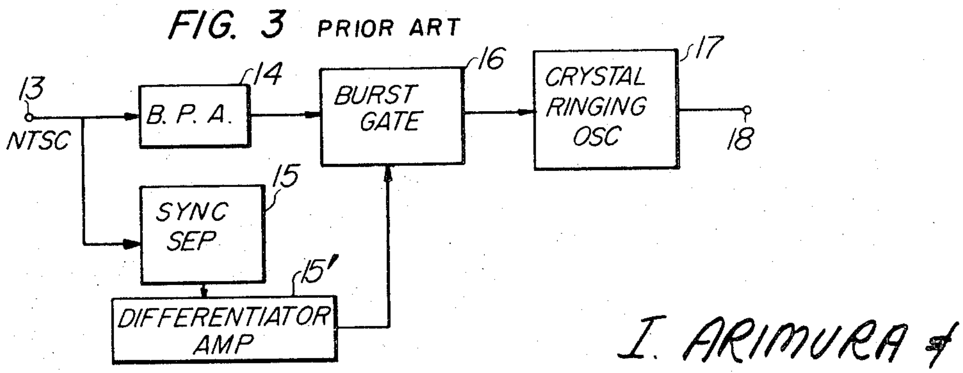
FIG. 3 PRIOR ART
FIG. 3 is a block diagram of a system for producing the reference sub-carrier using a ringing circuit also in the conventional color television receiver.

The following description will be given taking examples by the color television signal of the NTSC system, in which about eight cycles of the 3.58 MHz reference signal 2 are inserted in the back porch of each horizontal synchronization signal 1 and two components of the color signal 3 are superimposed on the brightness signal as an orthogonal two-phase modulation of the same 3.58 MHz signal, as shown in FIG. 1. In order to detect the color signals from such a composite television signal in the receiver, it is necessary first to have a continuous signal synchronous in phase with the reference signal and then to phase-detect the modulated 3.58 MHz signal with said continuous signal. A conventional system used for such a purpose is the APC circuit as shown in FIG. 2, in which the reference burst signal is extracted, by means of a burst gate 8, from the NTSC composite signal received at input terminal 4 and amplified through a band pass amplifier (BPA) 5, and the extracted reference signal is compared as regards the phase of oscillation with the output of a variable frequency oscillator 10 consisting of a crystal and a variable reactance element by means of a phase comparator 9, the resultant error signal being applied to said variable reactance element through a hold circuit 11 thereby to obtain a continuous signal synchronized with the reference signal as regards the phase at an output terminal 12. In FIG. 2, reference numerals 6 and 7 designate a synchronization signal separating circuit and a differentiator with amplifier respectively. Another conventional system used for the same purpose is the ringing circuit system as shown in FIG. 3, in which the reference burst signal is taken out, by means of a burst gate 16, from the composite signal received at the input terminal 13 and amplified through a BPA 14, and the extracted reference signal is used to drive a crystal ringing oscillator 17, thereby a continuous signal which is in the same phase relation with the trigger reference signal is obtained at the output terminal 18 during one horizontal sweep period. Reference numerals 15 and 15' designate a circuit for separating the synchronization signal and a circuit for differentiating the back edge thereof. The systems shown in FIGS. 2 and 3 are satisfactory in their stability, as crystal oscillators are used in these systems. However, the frequency range in which the synchronization of the oscillation to the reference signal can be achieved is very narrow with these systems, it being at most on the order of 1 kHz. Therefore, if the television signal has passed through a system such as a simplified VTR which may cause a comparatively large variation in the time base of the signal and the reference signal has thereby undergone a frequency variation as large as several tens of kHz, it will be impossible to produce the above-mentioned synchronized continuous signal on the basis of the affected reference burst signal.

The possible variation in the time base of the simplified VTR is usually 0.3% rms (about 0.9% pp). This corresponds to approximately 35 kHz of frequency variation in the reference signal reproduced from a magnetic recording tape through the VTR. In order to ensure the production of the synchronized continuous signal with such an affected reference signal, the pull-in frequency range of the oscillator is required to be at least two times as broad as the possible variation range, that is, to be at least 70 kHz.

This difficulty has been overcome by the present invention. The system of the present invention will be described in detail hereunder.

Figure 4:
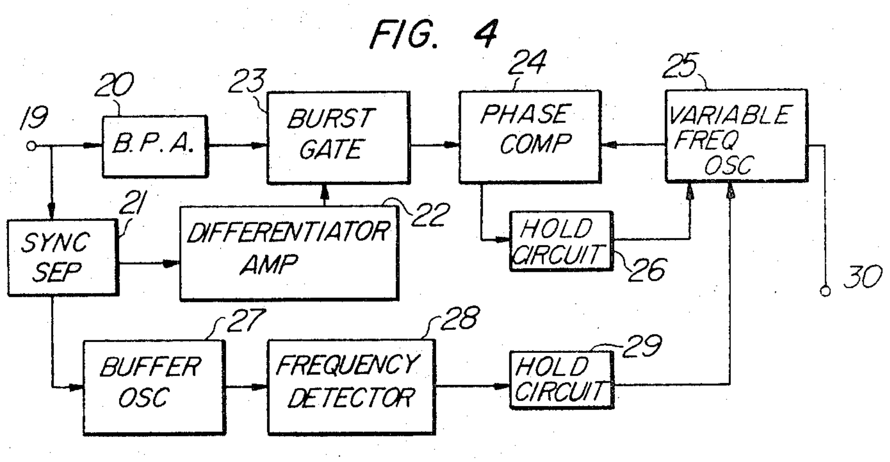
FIG. 4 is a block diagram of a system for producing the synchronized continuous signal according to this invention.
Figure 5:
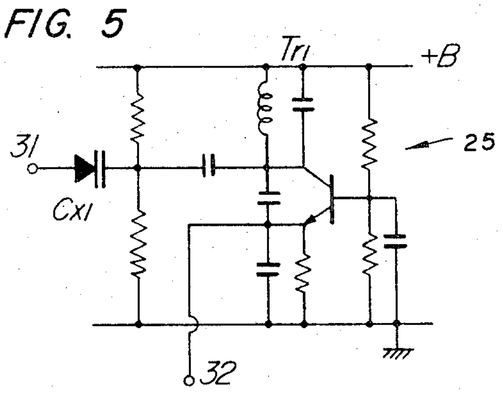
FIG. 5 is a connection diagram of an example of the variable frequency oscillator.

Referring to FIG. 4 which shows a block diagram of an embodiment of this invention, reference numeral 19 designates an input terminal at which an NTSC signal is received, 20 a BPA for 3.58 MHz sub-carrier, 21 a synchronization signal separating circuit, 22 a circuit for differentiating the back edge of the horizontal synchronization signal and amplifying the resultant pulse, the amplified pulse being applied to a burst gate 23 as the gating pulse, 24 a phase comparator for comparing the reference signal from the burst gate 23 with the output of a variable frequency oscillator 25 as regards the phase, 26 a hold circuit for the error signal resulted from the above comparison. It should be noted that the oscillator 25 is not a crystal oscillator in this invention, but consists of an LC circuit such as a Hartley circuit or a Colpits circuit and a variable reactance element such as a variable capacitance element or a reactance transistor. An example of the fundamental form of such an oscillator is shown in FIG. 5. Returning to FIG. 4, reference numeral 27 designates a buffer oscillator driven by the synchronization signal and consists of a twin tee oscillator or an astable multivibrator. Alternatively, a flip-flop having a large speed-up capacitor, or a known frequency multiplier, or a combination of such a multiplier and a buffer oscillator or flip-flop, may be used for the buffer oscillator. Such a buffer is necessary for deadening any irregularity of noise in the synchronization signal such as the different pulse pattern during the vertical synchronization period, noise due to a drop-out, or noise caused by the alternation of pick-up heads of a VTR. Numeral 28 designates a frequency discriminator or detector for the signal from the buffer oscillator 27. This frequency detector 28 may be of any known type, such as the one utilizing frequency characteristics of a resonant circuit or the one based on frequency response of a filter. A harmonics generating means (not shown) may be connected between the buffer oscillator 27 or flip-flop and the frequency detector 28 to produce higher harmonics of the oscillation. Numeral 29 designates a hold circuit consisting of a capacitor and a resistor, which holds the detected signal with a considerably large time constant to drive the variable reactance element of the variable frequency oscillator 25. Thus, the oscillator 25 is controlled by both of the APC circuit and the AFC circuit.

In FIG. 5 which shows the fundamental form of a variable frequency oscillator utilizing a Colpits circuit, 31 designates an input terminal through which the error signal in the phase comparison is introduced, 32 an output terminal of the oscillator, and $Cx_1$ indicates a variable capacitance element.

Figure 6:
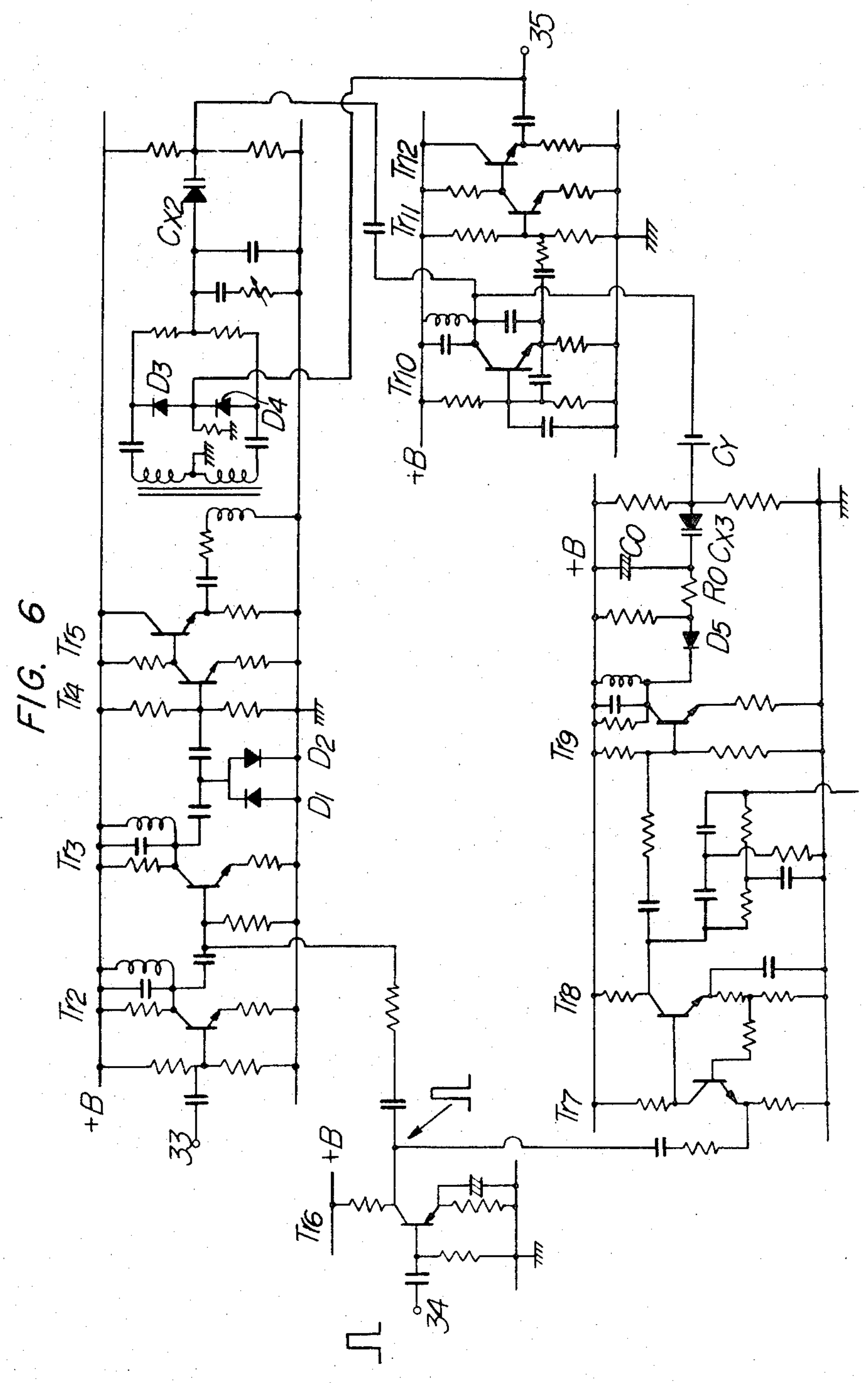
FIG. 6 is a connection diagram of an embodiment of this invention.

Referring to FIG. 6 which is a connection diagram corresponding to the block diagram shown in FIG. 4, reference numeral 33 designates an input terminal for the NTSC signal, 34 an output terminal for the synchronization signal separated from the NTSC signal, and an output terminal 35 for the objective continuous signal synchronized with the reference burst signal. The stage represented by $Tr_2$ is a 3.58 MHz, BPA, $Tr_3$ a burst gate, $Tr_4$ and $Tr_5$ an amplifier and emitter follower, $Tr_6$ a pulse amplifier, $Tr_7$ and $Tr_8$ a buffer amplifier, $Tr_9$ a frequency detector utilizing a resonant circuit, $Tr_{10}$ a Colpits oscillator, and $Tr_{11}$ and $Tr_{12}$ an amplifier and emitter follower.

Figure 7:
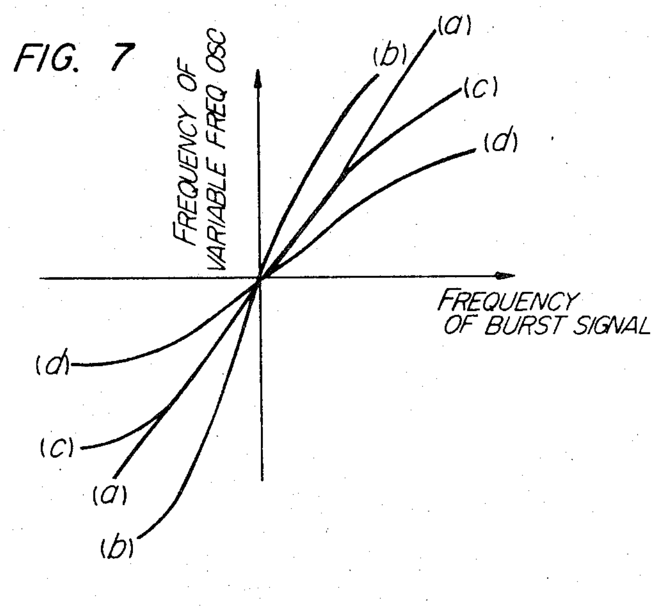
FIG. 7 is a graph showing characteristics of the AFC circuit.

Diode $D_1$ and $D_2$ constitute a limiter for the burst signal, $D_3$ and $D_4$ a phase-detector, and $D_5$ is a rectifier. Index $Cx_2$ designates a variable capacitance element driven by the error signal from the phase comparator, $Cx_3$ another variable capacitance element driven by the frequency-detected signal, and a Cy a coupling capacitor for setting the frequency control characteristics of the AFC circuit. The capacitance of the capacitor Cy is chosen so as to impart a frequency control characteristic (c) nearest to but not exceeding the optimum characteristic (a) shown in FIG. 7. A too large capacitor Cy will cause an excessive control as indicated by a curve (b) in FIG. 7, while a too small capacitor will result in insufficient control as shown by a curve (d) in FIG. 7. Capacitor $C_0$ and resistor $R_0$ of the hold circuit in the AFC circuit should be chosen so as to substantially absorb a signal of higher frequency than 60 Hz, since the noise caused by the alternation of pick-up heads of a VTR and the vertical synchronization signal appear at the rate of 60 Hz and affect the horizontal synchronization signal.

Figure 8:
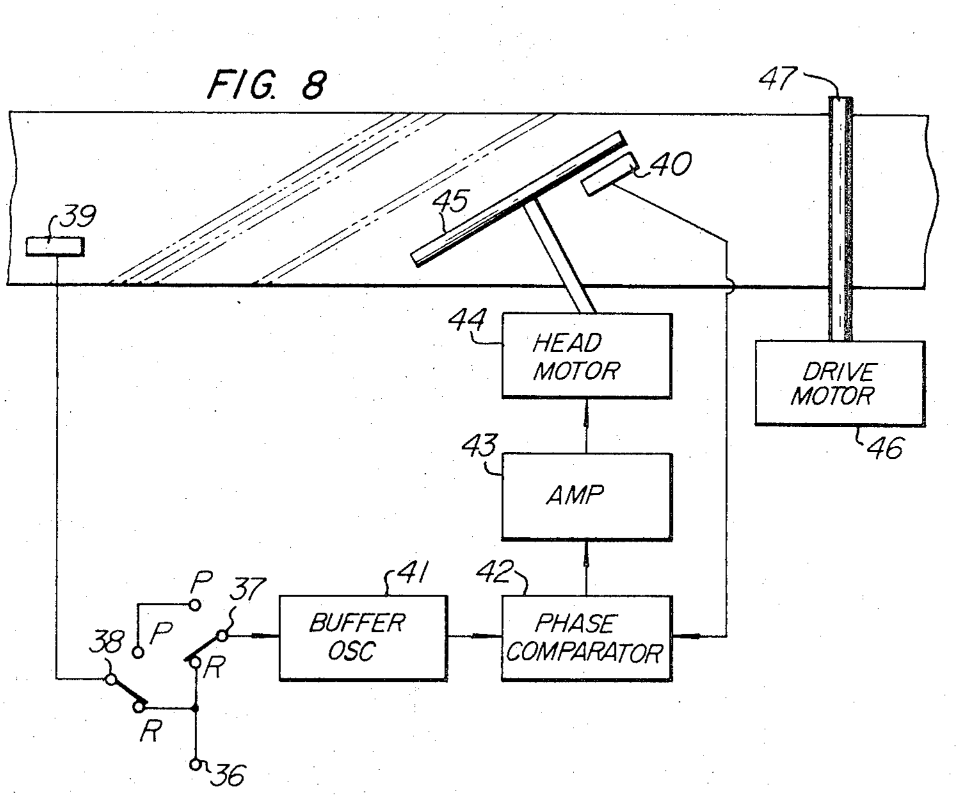
FIG. 8 is a schematic diagram for explaining the driving system of a VTR.

Prior to describing another embodiment of this invention, a brief explanation about a magnetic recording and reproducing system such as the VTR will be given hereunder. Referring to FIG. 8, reference numeral 36 designates an input terminal for the vertical synchronization signal taken from the TV signal, 37 and 38 record-reproduction selector switches, 39 a magnetic head for recording and reproducing the control signal, 40 another magnetic head for sensing the rotational phase of the rotating head, 41 a buffer oscillator, and 42 a phase comparator for comparing the phase of oscillation of the buffer oscillator 41 with the rotational phase of the rotating head, the error signal being amplified through an amplifier 43 to be used for controlling the rotational phase of a head motor 44. Alternatively, an open loop control is possible with the sensing head 40 and the comparator 42 being omitted. Reference numeral 45 designates a rotary head disc, 46 a tape driving motor, and 47 a capstan for driving the magnetic tape. During a recording operation, the head motor 44 rotates in synchronization, as regards the phase, with the vertical synchronization signal received at the terminal 36, and concurrently the same signal is recorded on the magnetic tape as the control signal by means of the head 39. During a reproducing operation, the control signal is picked up by the head 39 and the head motor 44 is rotated in synchronization with said control signal. Thus, the tracking of the video heads mounted on the head disc 45 is maintained. Therefore, the stability of the reproduced signal depends on the uniformity of the speed of the tape driven by the motor 46 and the capstan 47 and on the followability of the head motor 44 to control signal as regards the phase, and these factors in turn depend upon the stability of the supply reel and the winding reel, expansion or contraction of the tape due to the temperature, and other various conditions.

Figure 9:
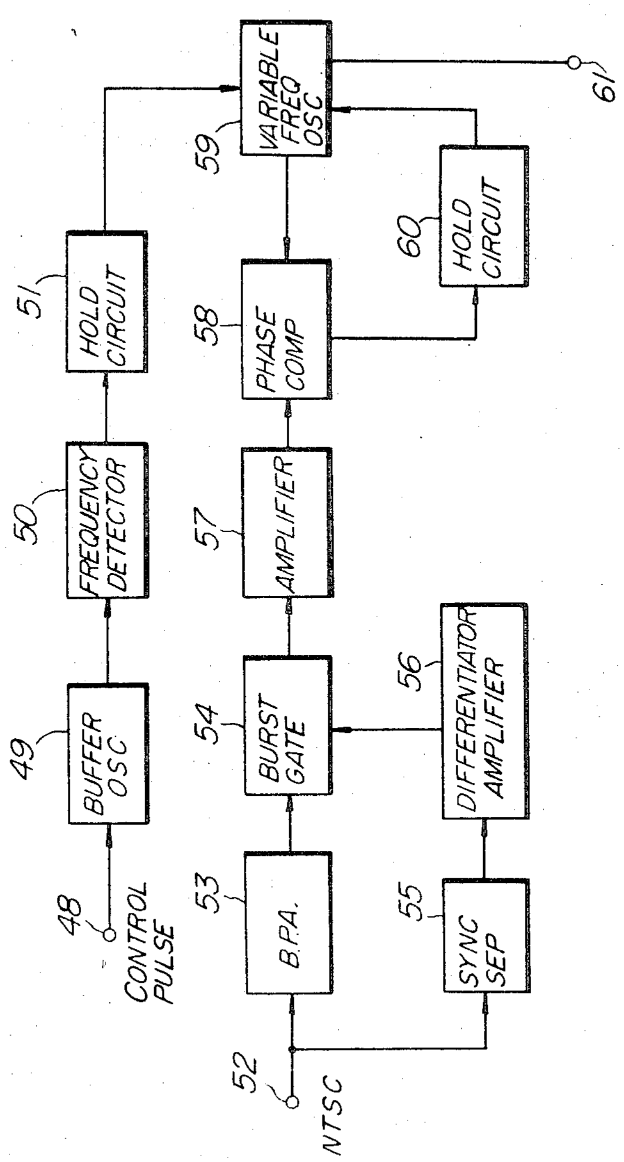
FIG. 9 is a block diagram of another embodiment of this invention.

The next embodiment of this invention is constituted so as to be immune from the variation in time base which the reproduced signal may have owing to the above-mentioned causes. In FIG. 9, numeral 48 designates an input terminal for the control signal derived from the head 39 or 40 of the VTR, 49 a buffer oscillator driven by said control signal, and 50 a frequency detector similar to the detector 28 shown in FIG. 4. Also similar to the corresponding circuits shown in FIG. 4 are: hold circuit 51 input terminal 52 for the NTSC signal, BPA 53, burst gate 54, synchronization signal separating circuit 55, differentiating circuit 56, burst amplifier 57, phase comparator 58, variable frequency oscillator 59, hold circuit 60, and output terminal 61. The detailed connection in this embodiment also may be the same as that shown in FIG. 6 in connection with the previous embodiment, except that the input terminal 34 of FIG. 6 is connected to the source of the above-mentioned control signal in this embodiment instead of the synchronization signal source. With this system too, the range of pull-in frequency can be more than doubled as compared with that of the conventional system which only comprises an APC circuit.

Merits of this invention will be more clarified by still another embodiment which is described in detail hereunder.

If a composite color television signal recorded on a magnetic tape at the normal recording speed should be still-reproduced through a VTR of helical scan type with the tape stopped, the relative speed between the tape and the head would decrease from the normal speed by about 2 percent assuming that the normal tape speed is 30 cm/s and the diameter of head drum is 120 mm. Accordingly, the color sub-carried which is normally 3.58 MHz is reproduced as 3.51 MHz decreasing approximately 70 kHz. With such a large variation in the reference frequency, it is difficult to produce the continuous signal synchronized with the reference burst signal without fail even by means of the above-described versatile system utilizing both APC and AFC circuits.

According to a known method proposed to solve the above problem, the speed of the head motor is increased during the still-reproduction and the slow-motion reproduction to maintain the relative speed of the tape to the head substantially at the normal relative speed and thus to obtain a reproduced signal of substantially the same frequency as the normal value. However, such a method will not be materialized unless the difficulty involved in the considerably complicated constitution of the system is overcome.

According to the system of this invention, the continuous signal synchronized with the reference burst signal can be readily produced without fail even in the case of a still or slow motion reproduction of the recorded color television signal.

Figure 10:
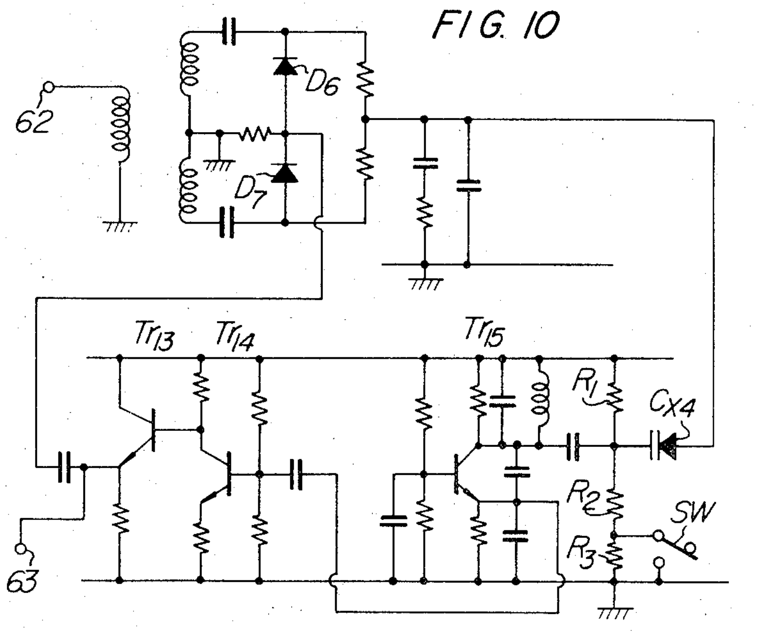
FIG. 10 is a connection diagram showing the essential portion of still another embodiment of this invention.

In FIG. 10, the circuit comprising diodes $D_6$ and $D_7$ is a phase comparator, the circuit represented by $Tr_{15}$ is an oscillator of Colpits types, and $Tr_{13}$, $Tr_{14}$ an emitter follower and amplifier. Index $Cx_4$ designates a variable capacitance element which constitutes a part of capacitance of the resonant circuit of the variable frequency oscillator, and $R_1$, $R_2$, $R_3$ resistors for setting the bias voltage for $Cx_4$.

When the television signal is being reproduced at the normal speed, the lever of the switch SW is at the opened position. In this state, the variable frequency oscillator is set so that the oscillation frequency thereof is substantially identical to the normal frequency of the reference burst signal. In the case of a still-reproduction or a slow-motion reproduction, however, the switch SW is closed to shunt the resistor $R_3$, thereby causing the bias voltage for the element $Cx_4$ and accordingly varying the capacitance of the element $Cx_4$. Thus, the natural oscillation frequency of the variable frequency oscillator is shifted to a frequency corresponding to the frequency of the burst signal reproduced in the still or slow-motion mode.

With the arrangement, the continuous signal synchronized with the reference burst signal is easily and surely obtained even in the still or slow-motion reproduction, thus making it possible to present a still or slow-motion color image.

It will have been understood from the description in the preceding paragraphs that the synchronization of an oscillator with the reference burst signal as regards the phase can be achieved even if the reference signal has undergone considerably large variation in the time base. Next, a color television reproduction system which incorporates the above-described synchronization system and which is simple-structured, stable and of high resolution, will be described.

Figure 11:
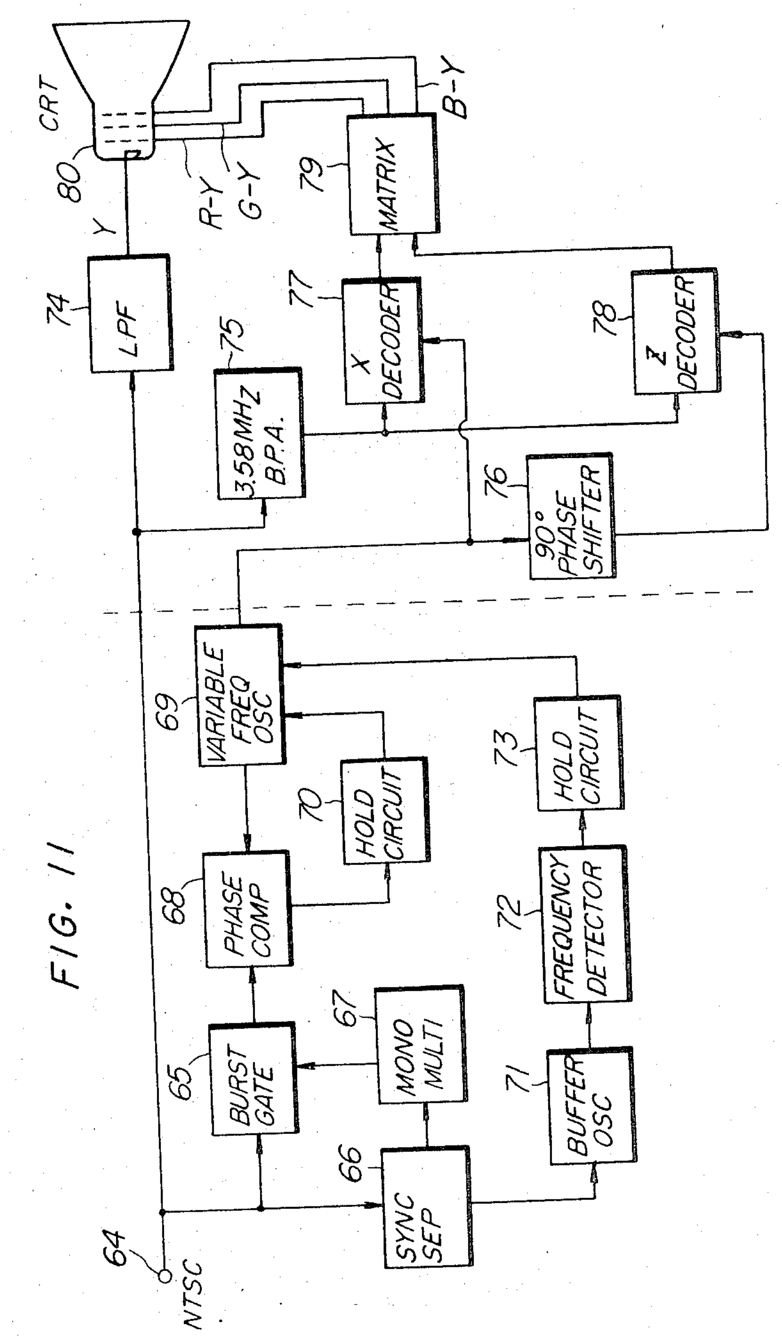
FIG. 11 is a block diagram for explaining the method for reproducing a color television signal recorded on a magnetic tape and for detecting the color signals according to this invention.

Referring to FIG. 11, reference numeral 64 designates an input terminal for the NTSC composite color television signal reproduced through the VTR, 66 a synchronization signal separating circuit, 67 a mono-stable multivibrator to be triggered by the back edge pulse of the horizontal synchronization signal, 65 a burst gate operated by the signal from the mono-stable multivibrator 67, numeral 68 a phase comparator for comparing the burst signal with the output of a variable frequency oscillator 69 as regards the phase of the oscillation, 70 a hold circuit for holding the error signal from the phase comparator 68 to drive the variable reactance element of variable frequency oscillator 69, numeral 71 a buffer oscillator driven by the synchronization signal, 72 a frequency detector for detecting the oscillation frequency of said buffer oscillator, and 73 a hold circuit for holding the output signal of the frequency detector 72 to drive the variable reactance element of said variable frequency oscillator 69 along with the signal from the above-mentioned hold circuit 70. Through this system, a continuous signal synchronized with the reference burst signal is obtained at an output terminal of the variable frequency oscillator 69 as described previously. This continuous signal is fed to a color television receiver for decoding the color signal. On the other hand, the television receiver also receives the reproduced NTSC signal directly from the input terminal 64. A part of this NTSC signal is applied to the cathode of a color cathode ray tube 80, after the color sub-carrier is attenuated through a low pass filter (LPF) 74 if it is necessary. The other part of the NTSC signal is fed to a 3.58 MHz BPA 75 to separate the modulated color signal, and the separated color signal is supplied to an X signal decoder 77 and a Z decoder 78 (or alternatively I and Q signal decoders) where X signal and Z signal (or I signal and Q signal) are respectively demodulated using the above-mentioned continuous signal from the variable frequency oscillator 69, a part of the continuous signal being shifted by 90° through a phase shifter 76. The thus demodulated X and Z signals (or I and Q signals) are introduced to a matrix circuit 79 which in turn produces R–Y, G–Y and B–Y signals to be applied to the respective grid electrodes of the cathode ray tube 80.

According to this method, a stable reproduction of a recorded color signal can be achieved with a very simple circuit but with a high resolution, since it is not necessary to record the pilot signal on the magnetic tape nor to remove the jitter by means of a heterodyne system and thus the Y signal band is not unduly limited.

Though the present invention has been described in connection with a few embodiments, it will be understood that other modifications are possible within the scope of this invention.

What we claim is:

1. A system for producing a continuous signal in synchronous phase with a color burst signal of a color television signal containing said color burst signal and a periodic signal in a fixed phase relation to one of the horizontal and vertical synchronization signals of said color television signal, comprising an oscillator, the oscillation frequency of which is variable with variable means included therein and responsive to signals, means for comparing the output of said oscillator with said color burst signal as regards the frequency and the phase to produce a first error signal, means for detecting the variation in frequency of said periodic signal to produce a second error signal, means for applying said first error signal to said variable means in a closed loop, and means for applying said second error signal to said variable means in an open loop.

2. A system as defined in claim 1, wherein said periodic synchronizing signal is the driving signal of a television signal recording and reproducing apparatus.

3. A system as defined in claim 1, wherein said means for detecting the variation in frequency of said periodic signal comprises a buffer oscillator which oscillates in synchronization with said periodic signal and a frequency detector for detecting the variation in oscillation frequency of said buffer oscillator.

4. A system as defined in claim 1, wherein said means for detecting the variation in frequency of said periodic signal comprises a triggered oscillator which is driven with said periodic signal and a frequency detector for detecting the variation in oscillation frequency of said triggered oscillator.

5. A system according to claim 1, wherein said periodic signal is the horizontal synchronization signal per se.

6. A system according to claim 1, wherein said periodic signal is the vertical synchronization signal per se.

* * * * *